US011062184B1

(12) United States Patent
Parsons et al.

(10) Patent No.: US 11,062,184 B1
(45) Date of Patent: Jul. 13, 2021

(54) USING AUGMENTED REALITY TO PERFORM COMPLEX PRINT JOBS

(71) Applicant: Xerox Corporation, Norwalk, CT (US)

(72) Inventors: David Parsons, Victor, NY (US);
Andrew T. Martin, Honeoye Falls, NY (US); Shane Michael Jewitt, Webster, NY (US); Ken Hayward, Brockport, NY (US); Dragana Pavlovic, Littleton, MA (US); Michael J. Martin, Hamlin, NY (US); David C. Swift, Rush, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/774,154

(22) Filed: Jan. 28, 2020

(51) Int. Cl.
*G06K 15/02* (2006.01)
*G06K 15/00* (2006.01)

(52) U.S. Cl.
CPC ......... *G06K 15/025* (2013.01); *G06K 15/007* (2013.01); *G06K 15/1836* (2013.01)

(58) Field of Classification Search
None
See application file for complete search history.

(56) References Cited

U.S. PATENT DOCUMENTS

| 7,031,004 | B1 | 4/2006 | Hayward et al. |
| 7,904,825 | B2 | 3/2011 | Penke et al. |
| 8,781,886 | B2 | 7/2014 | Penke et al. |
| 9,721,394 | B2 | 8/2017 | Rosenthal et al. |
| 2007/0291119 | A1 | 12/2007 | Amico et al. |
| 2014/0063063 | A1* | 3/2014 | Scott ............... G06T 11/00 345/633 |
| 2018/0150810 | A1 | 5/2018 | Lee et al. |
| 2019/0188917 | A1 | 6/2019 | Cho et al. |

* cited by examiner

*Primary Examiner* — Thomas D Lee
(74) *Attorney, Agent, or Firm* — Fox Rothschild LLP

(57) ABSTRACT

Systems and methods are provided for using augmented reality to create a printing template. The method includes capturing, using a camera of a mobile electronic device, a real world image of a surface. The method further includes, by a processor, receiving the real world image, processing the real world image to isolate and measure a portion of the surface on which print job content is to be applied, creating a printing template conforming to a shape and area of the isolated and measured portion of the surface, causing the real world image to be output on a display, and causing the display to output the printing template over the real world image, overlaid over the isolated and measured portion of the surface.

26 Claims, 9 Drawing Sheets

USING AUGMENTED REALITY TO PERFORM COMPLEX PRINT JOBS

BACKGROUND

The present disclosure relates to custom print design and, in particular, to using augmented reality (AR) to scan three-dimensional (3D) surfaces to design customized printing templates to be applied to the 3D surfaces.

When designing rectangular print designs to be applied to two-dimensional surfaces, determining the length and width of the final design is fairly straightforward practice, given that only a length and a width are needed to complete the task. However, not every surface is a two-dimensional surface, and not every surface calls for a rectangular print. For these types of custom prints, the measurements needed to design the print become more complicated.

For example, custom print decals may be designed for use on multiple stair risers wherein the assemblage of the plurality of decals on the multiple stair risers forms an image. When viewing stair risers from the front, the width of each subsequent stair riser appears narrower than the width of the stair riser preceding it. Because of this, for a custom print job involving stair risers, not only do the measurements of each individual stair riser have to be taken into account, but also the depth of the stairs to account for this perceived change in width. These variables result in a complex and time-consuming series of measurements and calculations in order to properly design a template to be applied to the image that is to be printed onto the stair riser decals.

In addition to 3D surface measurements such as those taken of stair risers, other custom print jobs may require non-rectangular print parameters. These surfaces, like the stair riser surfaces, often require complex and precise measurements in order for the print job to be accurately be applied to the desired surface.

Due to the complexities of these surfaces and the accompanying prints, it is both difficult and time-consuming to design such custom print templates. Therefore, for at least these reasons, a better system and method of measuring complex surfaces and designing complex customized print templates is needed.

SUMMARY

According to an aspect of the present disclosure, a method for using augmented reality to create a printing template is provided. The method includes capturing, using a camera of a mobile electronic device, a real world image of a surface. The method further includes, by a processor, receiving the real world image, processing the real world image to isolate and measure a portion of the surface on which print job content is to be applied, creating a printing template conforming to a shape and area of the isolated and measured portion of the surface, causing the real world image to be output on a display, and causing the display to output the printing template over the real world image, overlaid over the isolated and measured portion of the surface.

According to various embodiments, the mobile electronic device is communicatively coupled to the display.

According to various embodiments, the printing template includes a plurality of separate template portions. Each of the separate template portions is configured to be applied to a unique portion of the print job content.

According to various embodiments, each of the plurality of template portions has an area and measured dimensions.

According to various embodiments, the method further includes receiving a selection of a type of print job.

According to various embodiments, the type of print job includes wall decals, wraps, window covers, stair risers, textiles, stickers, signage, crafts, and/or any other suitable types of print jobs.

According to various embodiments, processing the print isolating and measuring the portion of the surface further includes automatically identifying and isolating the portion of the surface correlating with the type of print job selected.

According to various embodiments, the method further includes, by the processor, applying the print job content to the printing template, causing the print job content to be displayed over the real world image, overlaid over the isolated and measured portion of the surface.

According to various embodiments, the method further includes, by a graphical user interface, selecting the print job content.

According to various embodiments, selecting the print job content includes uploading an image.

According to various embodiments, selecting the print job content includes selecting content from a list of available content.

According to various embodiments, the method further includes, by a graphical user interface, ordering a finalized print of the print job content conforming to the printing template.

According to another aspect of the present disclosure, a system for using augmented reality to create complex printing templates is provided. The system includes a mobile electronic device, which includes a memory, a processor, a graphical user interface, and a camera. The camera is configured to capture a real world image of a surface, the graphical user interface is configured to enable a user to select print job content, and the memory is configured to store software that, when run by the processor, causes the processor to receive the real world image, process the real world image to isolate and measure a portion of the surface on which the print job content is to be applied, create a printing template conforming to a shape and area of the isolated and measured portion of the surface, cause the real world image to be output on a display, and cause the display to output the printing template over the real world image, overlaid over the isolated and measured portion of the surface.

According to various embodiments, the system further includes the display, and the mobile electronic device is communicatively coupled to the display.

According to various embodiments, the software, when run by the processor, further causes the processor to apply the print job content to the printing template, causing the print job content to be displayed over the real world image, overlaid over the isolated and measured portion of the surface.

According to various embodiments, the printing template includes a plurality of separate template portions. Each of the separate template portions is configured to be applied to a unique portion of the print job content.

According to various embodiments, the software, when run by the processor, further causes the processor, when applying the print job content to the printing template, to determine a change in depth between each of the separate template portions, and resize each of the unique portions of the print job content according to the change in depth.

According to various embodiments, the graphical user interface is further configured to enable the user to select a type of print job.

According to various embodiments, the type of print job includes wall decals, wraps, window covers, stair risers, textiles, stickers, signage, crafts, and/or any other suitable types of print jobs.

According to various embodiments, selecting the print job content includes uploading an image.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. When used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Other terms that are relevant to this disclosure are defined at the end of this Detailed Description section.

Figure 1:
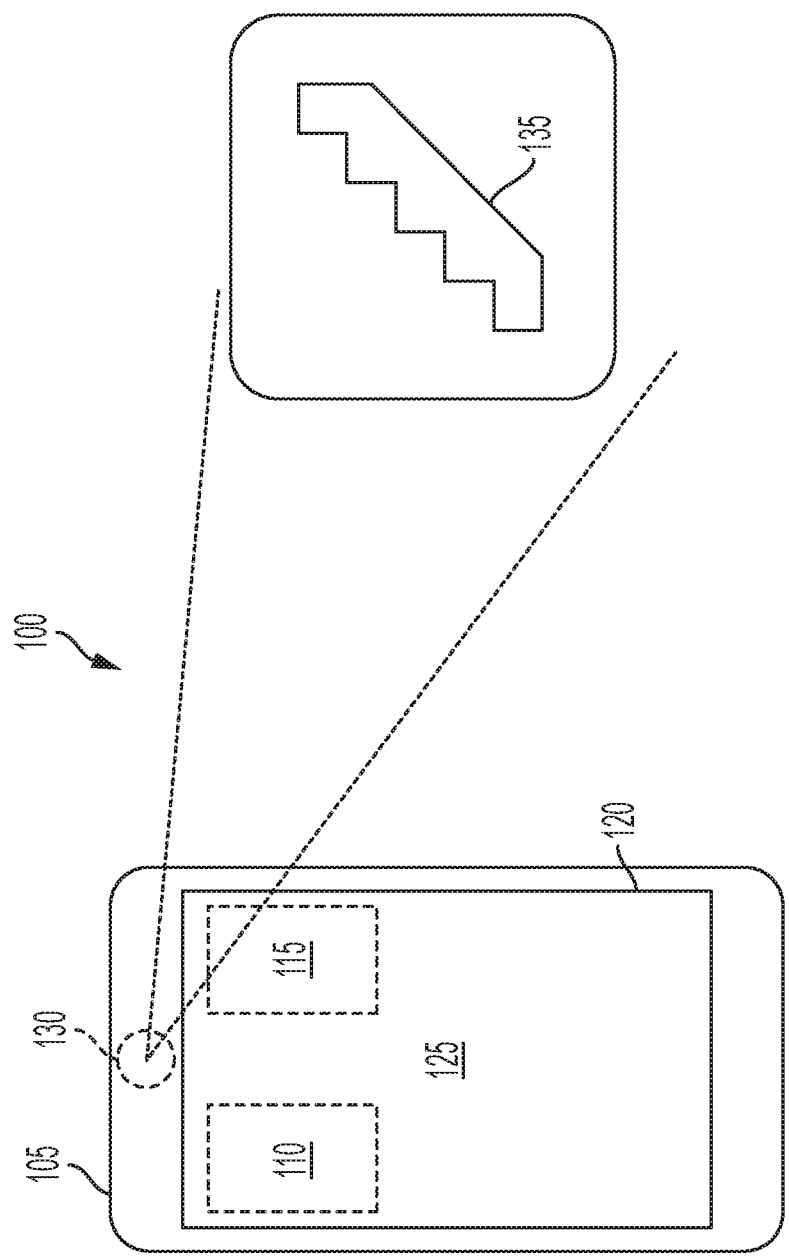
FIG. 1 is an example of a system for using augmented reality (AR) to create complex printing templates, in accordance with various embodiments of the present disclosure.

Referring now to FIG. 1, a system 100 for using augmented reality (AR) to create complex printing templates is provided.

According to various embodiments, the system 100 includes a mobile electronic device 105. The mobile electronic device 105 includes a memory 110, a processor 115, a graphical user interface 120 which includes a display 125, and a camera 130. The camera 130 is configured to capture a real world image of a surface 135 on which a printing template is displayed. The "real world image" is a photographic representation of an area that is in the field of view of the camera 130. The mobile electronic device 105 may be configured to display the image of the surface on its display 125 along with an AR simulation of the template superimposed over the surface 135 on the display 125. According to various embodiments, the template includes print job content. The "print job content" is the content, selected by the user, which is to be printed. It may include images, text, and/or any other suitable printable content. The print job content may be selected by a user using the graphical user interface 120. According to various embodiments, one or more components of the system 100 such as, for example, the camera 130, the display 125, and/or the graphical user interface 120, may be incorporated in a single electronic device and/or a plurality of electronic devices in electronic communication with each other. For example, the camera 130 may be a standalone camera 130, coupled to a separate device, or a component of the mobile electronic device 105. According to various embodiments, the system 100 may include a plurality of cameras 130 configured to enable the system 100 to take stereoscopic images for three-dimensional image analysis. According to various embodiments, the real world image is a stereoscopic image.

According to various embodiments, a user positions the mobile electronic device 105 such that the camera 130 is able to capture a real world image and/or video of the surface 135. According to various embodiments, the memory 110 is configured to store software/programming instructions which, when run by the processor 115, causes the processor 115 to analyze the real world image in order to identify and isolate one or more portions of the surface 135 in the real world image on which a print of the print job content is to be applied. Once the surface 135 is isolated, the programming instructions cause the mobile electronic device 105 to automatically determine one or more measurements of the surface 135. According to various embodiments, each of the portions forms a geometric shape having measured dimensions and a calculable area.

According to various embodiments, the software/programming instructions include one or more frameworks for performing object detection and/or measurement on objects in real world images. The one or more frameworks for performing object detection and/or measurement may include, for example, the scale-invariant feature transform (SIFT) framework, the histogram of oriented gradients (HOG) framework, the Viola-Jones object detection framework, the single shot multibox detector (SSD) framework, and/or any other suitable framework for detecting and/or measuring objects in real world images. According to various embodiments, the one or more frameworks for performing object detection and/or measurements may incorporate motion detection, shadow analysis, stereoscopic image analysis, and/or any other suitable relevant means for facilitating object detection and/or measurement. Motion detection, shadow analysis, and/or stereoscopic image analysis may be used for determining object detection, depth, distance, movement, and/or facilitating the measurement one or more sides of a surface of an object detected in the real world image. These and/or other methods of image analysis determine the shape of a surface of a detected object and may be used to determine and isolate a surface 135 of a detected object.

Once the system detects a surface, the system also may use one or more points of reference information to measure the object. For example, the system may ask a user to provide measurement characteristics for one or more facets of the surface. Alternatively, the system may ask the user to enter identifying information for an object in the image having known dimensions, and the system may correlate the dimensions of the object with the dimensions of a field of view. Then, when the surface onto which the print job content appears in the field of view, the system may determine how much of the field of view the object takes up, and associate corresponding dimensions with the surface. For example, the system may determine that a known object is 5 cm wide and takes up 5% of the horizontal dimension of the field of view. If so, it may determine that the field of view has a horizontal dimension of 100 cm. Then, when the surface appears in the field of view, the system may determine what percent of the field of view is taken by the horizontal dimension of the surface, and it may then multiple that percentage by the total field of view horizontal dimension (such as 100 cm) to determine the horizontal dimension of the surface.

According to various embodiments, the real world image analysis for detecting and measuring an object and isolating a surface 135 is performed using the mobile electronic device 105. According to other embodiments, the real world image analysis for detecting and measuring an object and isolating a surface 135 is performed using a remote device and/or server and the results of the analysis are sent to the mobile electronic device 105.

According to various embodiments, once an object is detected and/or measured and the surface 135 is isolated, the surface' 135 shape and/or size is compared to the shape and sizes of known surface types. If the surface's 135 shape and/or size is within an acceptable range from that of a known surface type, the surface 135 is determined to be of the known surface type. According to various embodiments, the surface's 135 size and/or shape may be within the acceptable range of two or more surface types.

According to various embodiments, one or more of the programming instructions may be stored on one or more remote servers or data centers, accessible to the mobile electronic device 105 via a wired or wireless connection (for example, via the cloud).

The measurements determined by the system 100 enable a printing template to be generated which would accurately fit over the isolated surface 135, wherein the printing template conforms to the shape of the isolated surface. The measurements may include surface area measurements such as length and width. The measurements may also include depth measurements and/or position measurements in the event that multiple surfaces 135 are measured. For example, if the surface 135 includes multiple stair risers, the positions of the stair risers in three-dimensional space and the depth between each of the multiple stair risers is calculated. These measurements may be used in altering the perspective of the image to be applied to the print template such that a viewer of the applied final print would accurately view the image from a particular perspective. For example, if a printing template includes a plurality of template portions, the print job content may be resized depending on the depth and/or angle of the template in three-dimensional space.

Once the printing template is generated, the mobile electronic device 105 may overlay the printing template over the real world image, presenting the user with an AR view, using the display 125 to display the AR image to the user. According to various embodiments, the printing template overlaying the real world image includes the print job content, enabling the user to view how the final printed product will look once it is printed and applied to the surface 135. According to various embodiments, the printing element, when incorporating the print job content, forms a proof.

Figure 3:
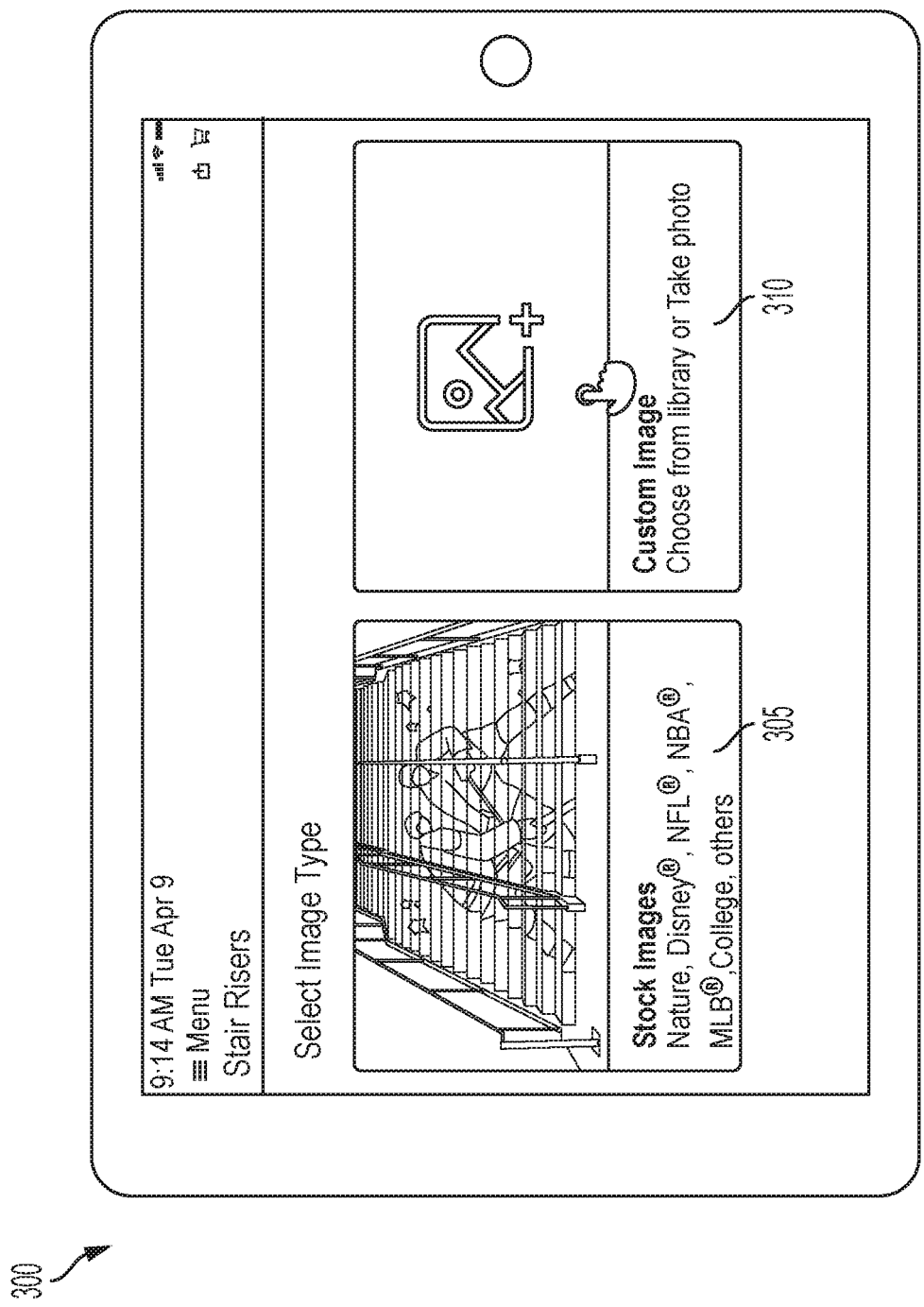
FIG. 3 is a screen shot of an example of a print job type selection menu, using a graphical user interface, in accordance with the present disclosure.

According to various embodiments, the graphical user interface 120 projects, onto the display 125, a print job content selection menu 300, as shown in FIG. 3. The print job content selection menu 300 may include a first selection tool 305 for making one or more selections of print job content from a list of stock content (for example, stock images, stock text, etc.) stored on the mobile electronic device 105 and/or accessible via a remote server, and a second selection tool for uploading print job content. According to various embodiments, prior to imaging the surface 135 using the camera 130, the user selects the type of print job 135 to be printed.

Figure 4:
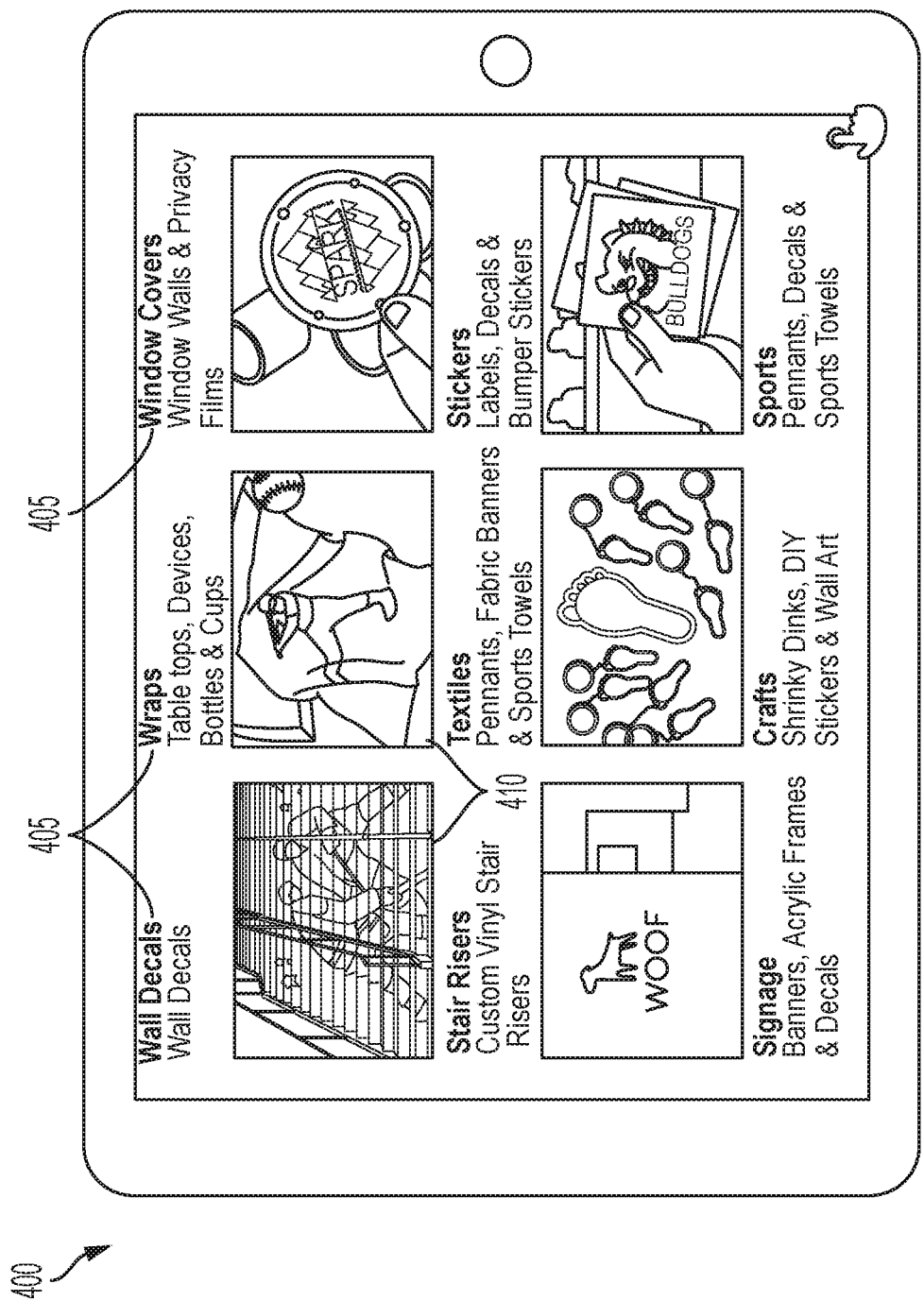
FIG. 4 is a screen shot of an example of a print job type selection menu, using a graphical user interface, in accordance with the present disclosure.

According to various embodiments, the graphical user interface 120 projects, onto the display 125, a print job selection menu 400, as shown in FIG. 4. The print job selection menu 400 includes one or more print job types 405 and/or images/diagrams 410 of various print job types from which the user may select. The print job types are selectable on the menu 400 (for example, using a mouse, a touch screen, and/or any other suitable selection means using the graphical user interface 120), enabling the user to select a print job type. As shown in FIG. 4, the type of print job 405 may include, for example, wall decals, wraps, window covers, stair risers, textiles, sticker, signage, crafts, and/or any other suitable print job types.

Figure 5:
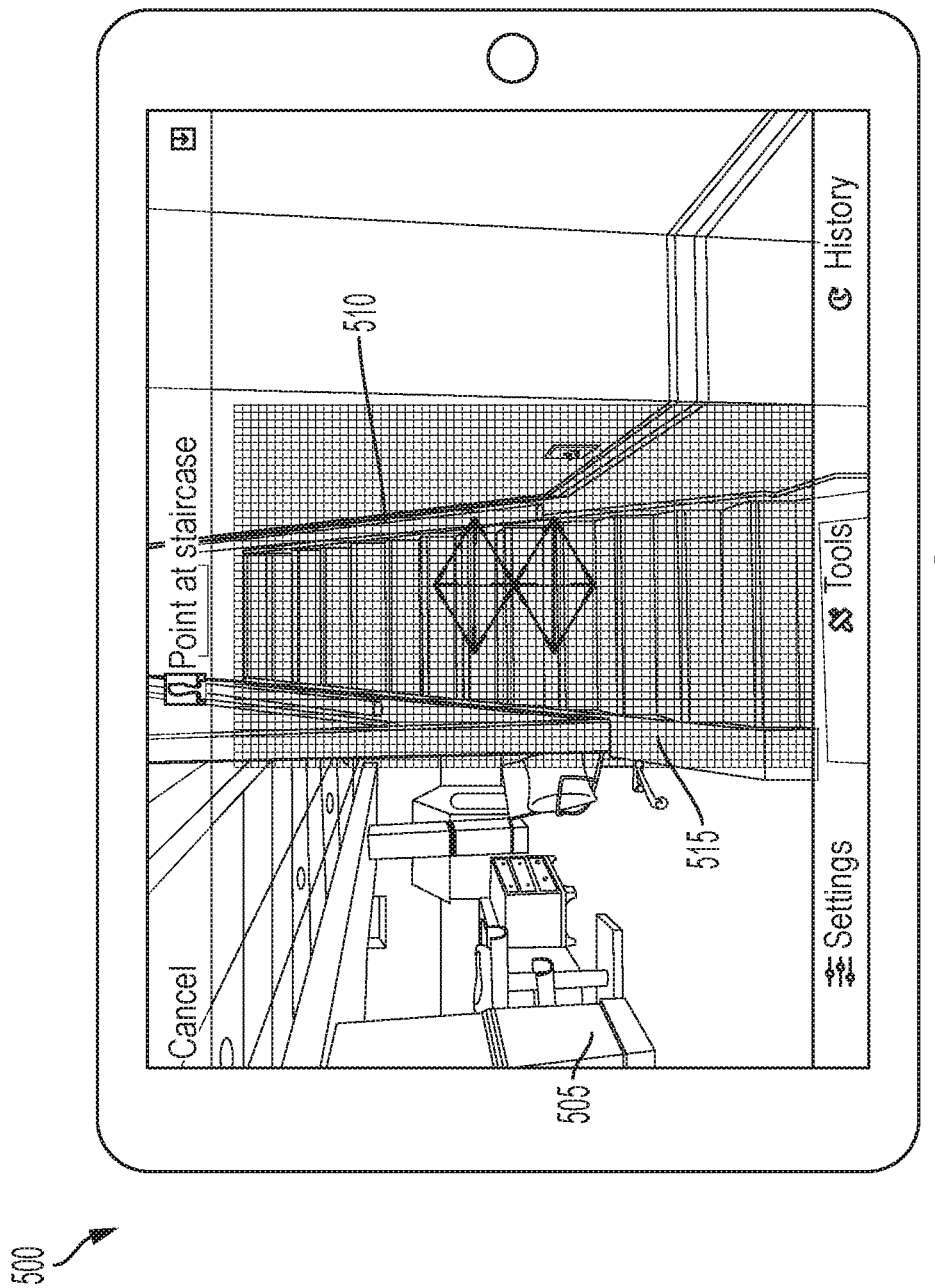
FIG. 5 is a screen shot of an example of a display of a camera viewing angle, in accordance with various embodiments of the present disclosure.

The memory 110 may be preprogrammed with software that, when run by one or more processors 115, enables the mobile electronic device 105 to determine the shape of one or more objects in the real world image in three-dimensional space, the to identify, isolate, and measure one of more of the one or more objects. Upon initiating image capturing by the camera 130, the system 100 may instruct the user to point the camera's 130 viewing angle toward a specific type of surface that correlates to a selected print job, if a type of print job was selected. According to an example, a user has selected a staircase riser as the type of print job. In this example, as shown in FIG. 5, one or more real world images 505 are captured by the camera 130 and displayed to the user on the display 125. Furthermore, in this example, since the user selected a print job type (the staircase), the system displays a notification 510 ("Point at staircase") to the user on the display 125 to aim the viewing angle of the camera towards an example of the selected print job type (the staircase). The notification 510 may be displayed over the captured image or may be on any suitable position on the display 125. According to various embodiments, an analyzation grid 515, designating which portion of the real world image 505 is being analyzed, is displayed over the real world image 505 in order to aid in positioning the camera's 130 viewing angle over the desired surface on which the selected print job content is to be applied.

According to various embodiments, after the camera 130 captures the real world image of the surface 135, the image is analyzed for surfaces suitable for the type or types of print job selected by the user using the graphical user interface 120. The suitable surface types for selected print job types may include, for example, flat surfaces, textured surfaces, multiple surfaces along the same plane or along multiple planes, and/or any other suitable type of surface for a selected type of print job. According to various embodiments, if no type of print job is selected, the mobile electronic device may be programmed to identify one or more print jobs based on the surfaces identified in the real world image captured by the camera 130, and present these one or more print jobs as suggestions to the user, enabling the user to select a print job from the one or more recommended print jobs. According to various embodiments, the print job type is automatically determined based on the image analysis. For example, the image analysis may determine a shape and/or dimensions of a surface. The determined shape and/or dimensions may be compared against known shapes and/or dimensions of known print job types. If the shape and/or dimensions of the surface in the analyzed image match the known shape and/or dimensions of a known print job type, within an acceptable margin of error, the surface in the analyzed image may be associated with that known print job type.

If the system detects a surface on which the print job content may be applied, the system highlights the surface on the display, overlaid over the real world image, presenting the user with an AR view of the real world image with the overlaid highlighted surface. The measurements of the surface are then calculated by the system.

Figure 6:
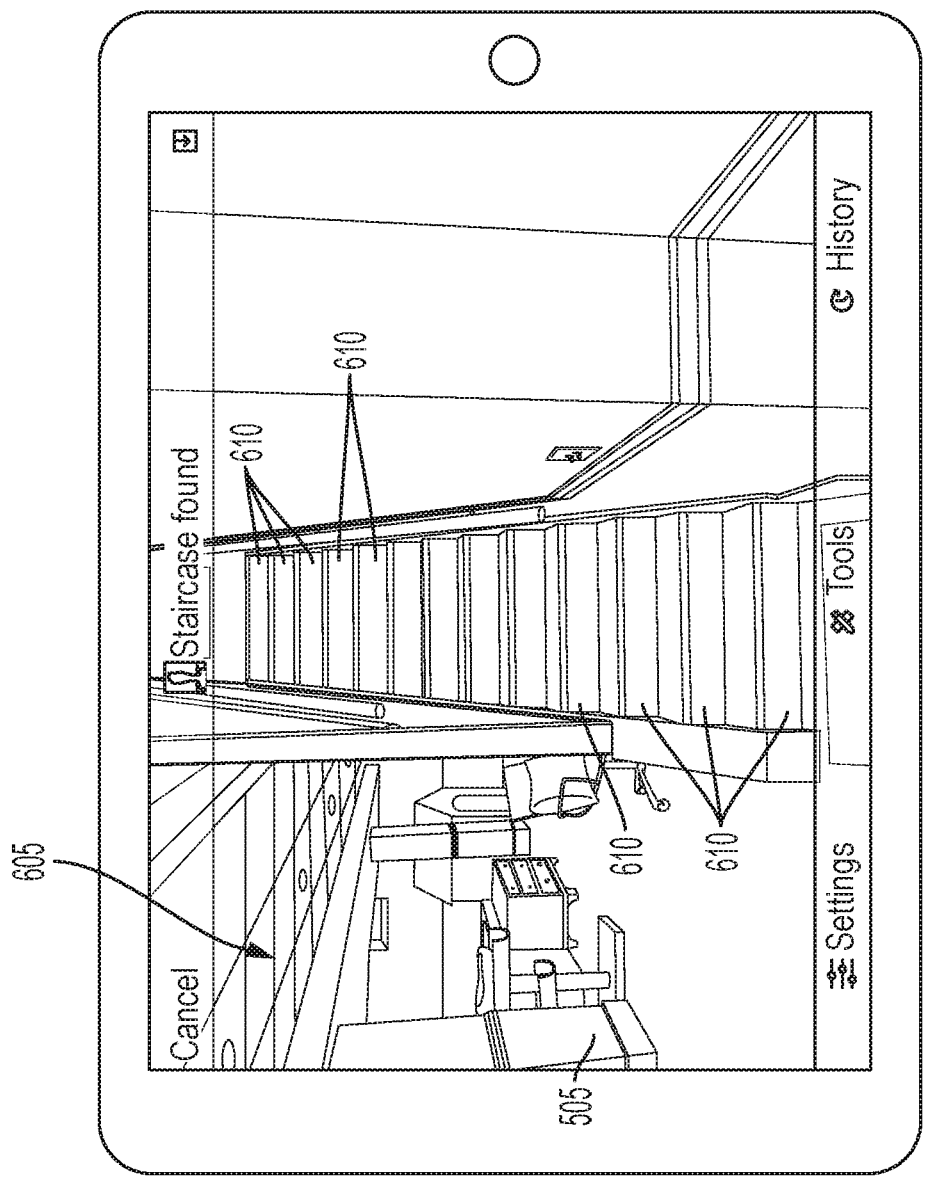
FIG. 6 is a screen shot of an example of a display of a camera viewing angle displaying a printing template in an AR view, in accordance with various embodiments of the present disclosure.

Using these measurements, the system 100 generates a printing template based on the identified and isolated surface and displays the printing template over the real world image 505. As shown in FIG. 6, an AR environment 605 is displayed to the user on the display 125, wherein the printing template 610 is overlaid onto the isolated surface, enabling the user to view the real world image 505 and the printing template 610. In the example shown in FIG. 6, the printing template 610 includes a plurality of components, wherein each component is positioned on a stair riser in the real world image 505. It is noted, however, that the printing template will be unique for each real world image and dependent on the print job type and the isolated surface.

Figure 7:
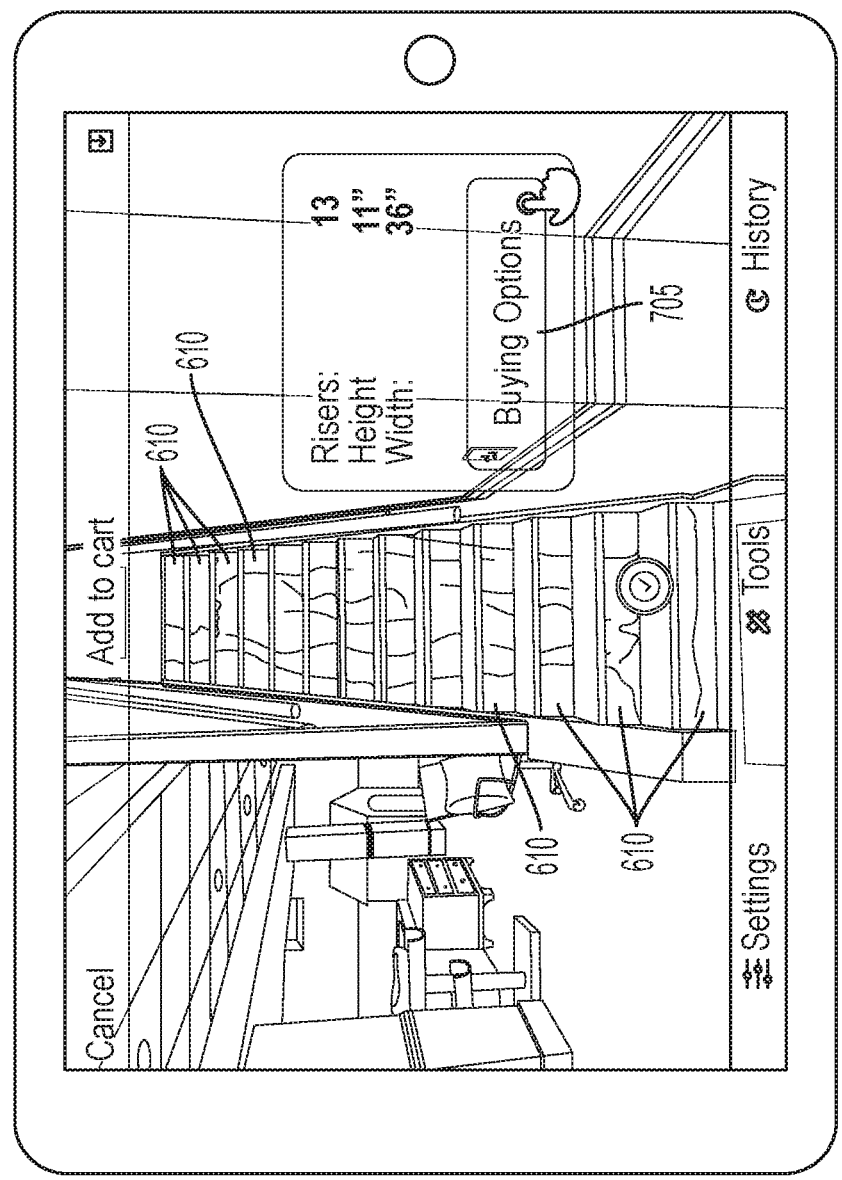
FIG. 7 is a screen shot of an example of a display of a camera viewing angle identifying and labeling risers on a staircase in a real world image, in accordance with various embodiments of the present disclosure.

According to various embodiments, the print job content is overlaid over the printing template 610, providing the user with an AR environment view of the surface with the print job content applied to the surface, as shown in FIG. 7. According to various embodiments, the printing template is displayed along with the measured dimensions 705 of the printing template, which approximately coincide with the measured dimensions of the surface on which the print job content is to be applied. For example, as shown in FIG. 7, the surface is a series of stair risers, and the number of stair risers, the height of each stair riser, and the width of each stair riser are displayed to the user in an AR environment.

Figure 2:
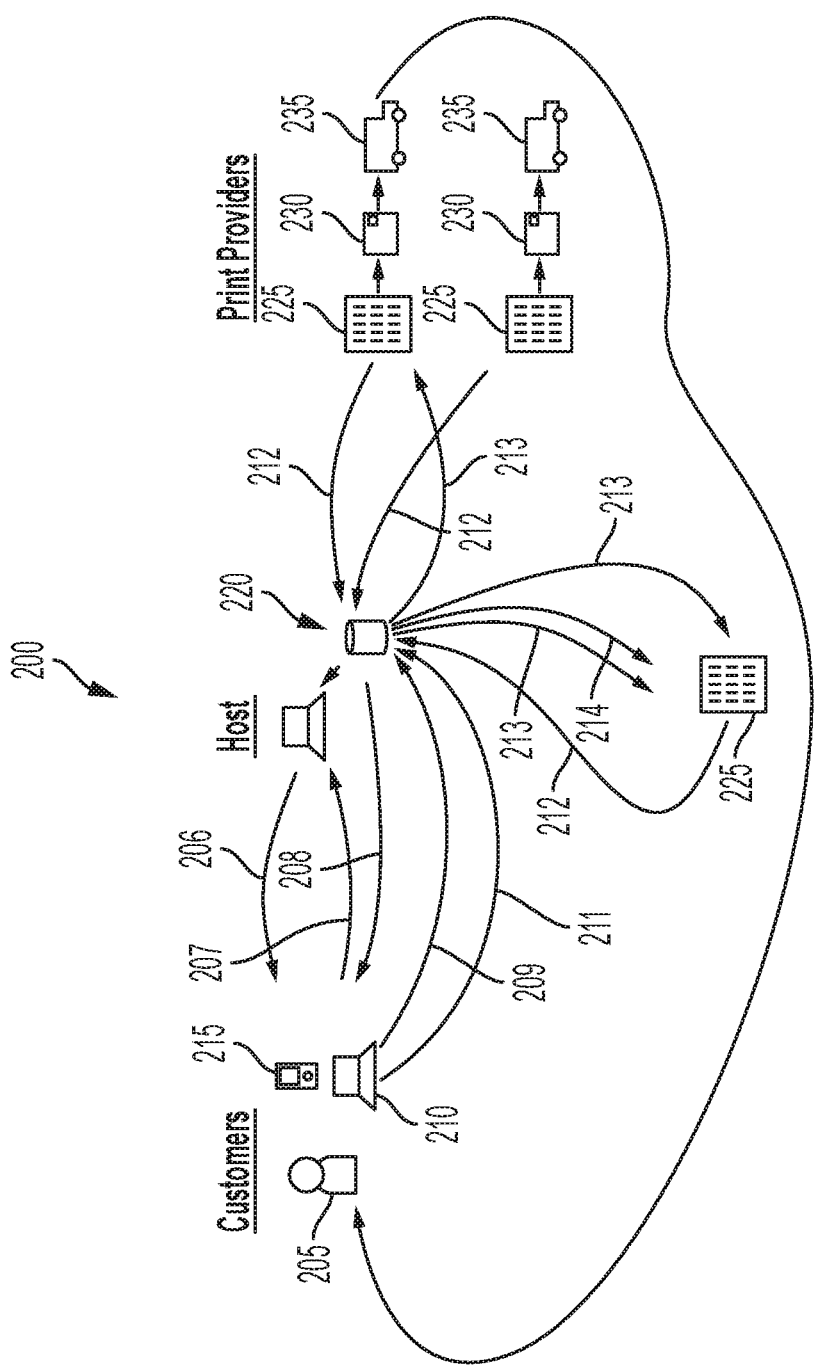
FIG. 2 is an example of a system for designing and ordering custom printed material, in accordance with the present disclosure.

Referring now to FIG. 2, a system 200 for designing and ordering custom printed material is provided.

According to various embodiments, one or more customers/users 205 access an electronic device (for example, a laptop computer 210, a smartphone 215, a tablet computer, and/or any other suitable electronic device). The electronic device is configured to enable the customer/user 205 to select print job content to be printed and customized to specific dimensions so as to enable the print job content to be applied to a surface. The electronic device may further be configured to identify, define, and/or measure the surface on which the print job content is to be applied, and to aid the customer in ordering the custom print material incorporating the print job content.

The print job content may be uploaded by the customer/user 205 or may be selected from one or more examples of print job content offered 206 to the user via a digital application. An example screen shot of a print job content selection menu is shown in FIG. 3, which enables the customer/user 205 to select from one or more examples of stock content or to upload content or take a custom image. Content from which the customer/user 205 may select may be separated into one or more categories. If the user chooses to upload an image, any images available for upload may be displayed to the user. If the user chooses to input text, a text box for inputting the text may be displayed to the user. The digital application may be a website and/or standalone software, which may be accessed by the electronic device 210, 215. According to various embodiments, the one or more examples of stock content offered are sent to the electronic device via a remote host 220. Once the printing template is created and the print job content selected, the customer/user 205 may send an order 207 for the custom print material to the remote host 220. The electronic device and the remote host 220 may be in electronic communication with each other.

Based on information pertaining to the custom print material (for example, the location of the customer/user, the size of the printing template, the complexity of the shape of the printing template, capabilities based on pricing and incentives, and/or any other relevant information), the remote host 220 generates a list of printing providers 225 and presents 208 the list of printing providers to the user via a graphical user interface coupled to the electronic device. The generated list of providers 225 may include, for example, the names of the providers, the location of the providers, any reviews/ratings for any of the providers, a quoted price for the custom print material for each of the providers, and/or any other suitable information pertaining to the providers. According to various embodiments, any pricing and/or incentives from each of the providers 225 are sent 212 to the host to dissemination to the customer/user 205.

The customer/user 205, upon receiving the list of providers, may rate 209 the providers. The customer/user selects 211 a provider 225 to create the custom print material 230 (also known as the product) and submits the order to the selected provider 225, with payment. Details pertaining to this order are then sent to the selected provider 225. The order details 213 and process and payment 214 are sent to the provider 225

Once the order is made to the selected provider 225, the selected provider creates the product 230 and ships, at 235, the product 230 to the customer/user 205.

According to various embodiments, the system 200 includes a print device configured to perform a print job designed by the system 200, eliminating the need to send the print job to a provider 225 for printing. According to this embodiment, the user 205 sends the print order, in the form of a print job file, from the electronic device 210, 215 to a print device in electronic communication with the electronic device 210, 215 via a wired and/or wireless network or connection. According to various embodiments, the user 205 may save the print job file to a portable memory device for insertion into the print device, enabling the print device to read the print job file and perform a printing function, producing the completed print product.

Figure 8:
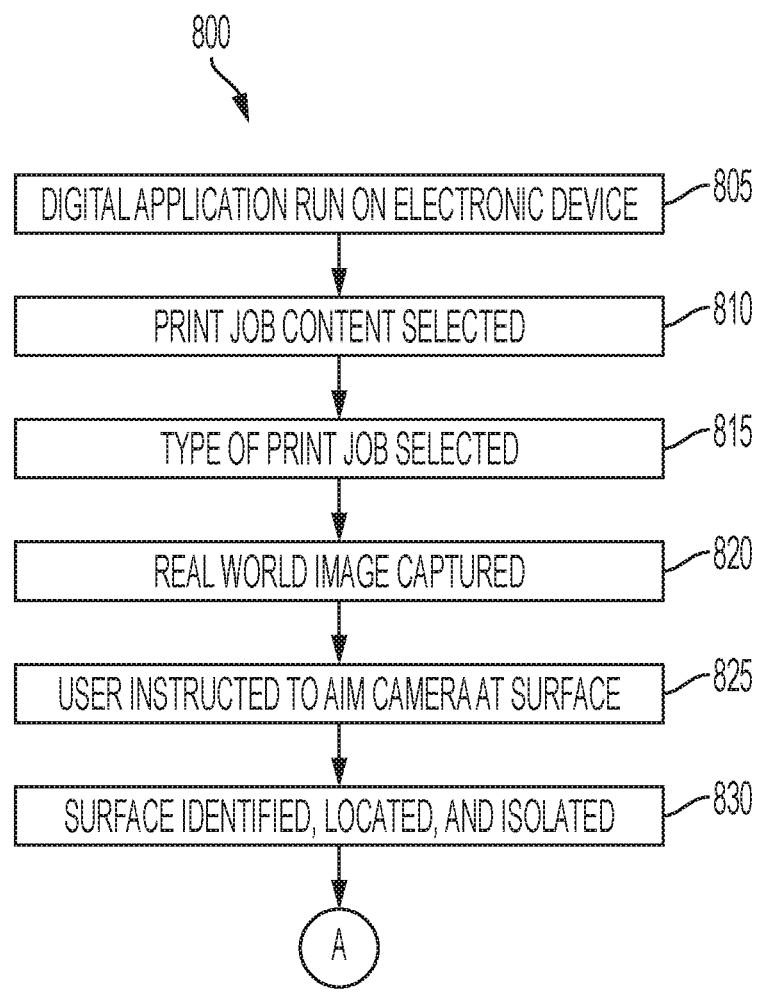
FIGS. 8-9 is a flowchart of an example of a method for using AR to create and order complex printed material, in accordance with various embodiments of the present disclosure.
Figure 9:
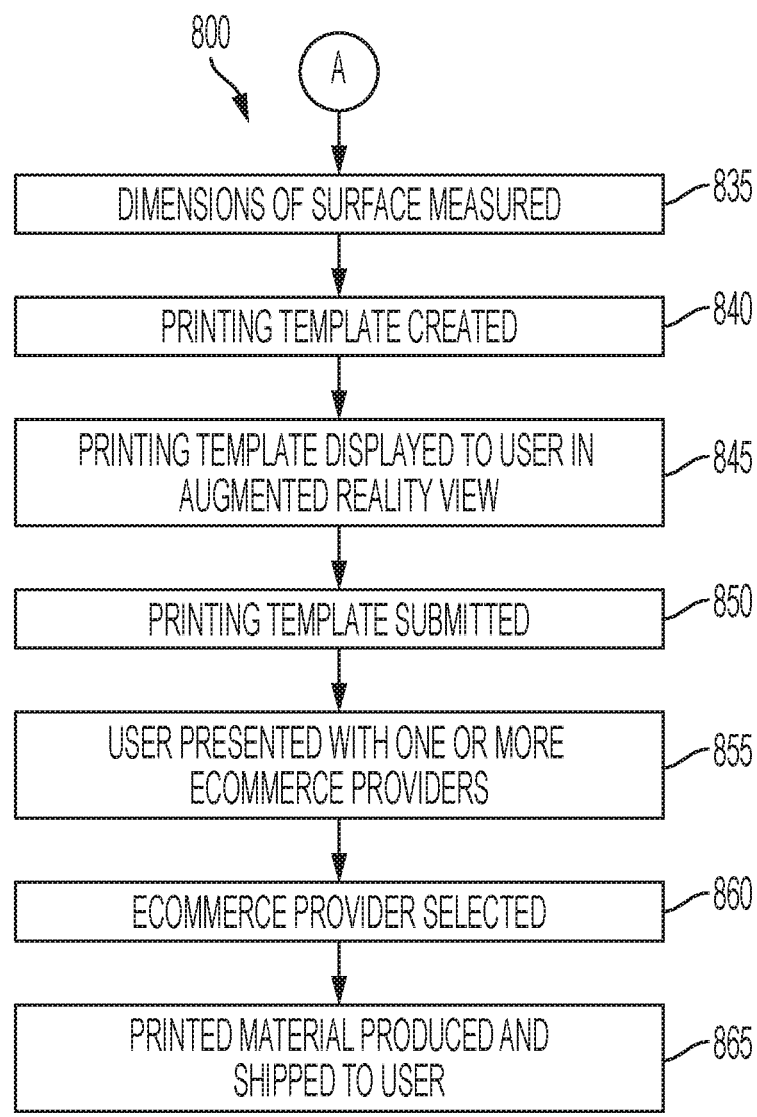

Referring now to FIGS. 8-9, a flowchart of an example of a method 800 for using AR to create and order complex printed material is provided.

According to various embodiments of the present disclosure, one or more functions of method 800 are performed using a digital application run on an electronic device. The digital application, at 805, is run on the electronic device. Programming instructions for running the digital application and for performing one or more of the functions of the method 800 may be stored on the electronic device and/or may be accessed remotely by the electronic device. According to various embodiments, prior to running the digital application, the digital application is downloaded onto the electronic device.

Using a graphical user interface coupled to the electronic device, at 810, an image is selected from an image selection menu. The selected image is the print job content which is to be printed onto the complex printed material. The print job content may be an image, text, and/or any other suitable form of printable content. According to various embodiments, selecting the image includes uploading a custom image using the graphical user interface. According to various embodiments, selecting the print job content includes selecting content from a selection of stock content available through the digital application.

The final print job content to be printed is designed to be applied to a surface. Therefore, the selected print job content, or a portion thereof, is to be applied to the surface. According to various embodiments, at 815, a type of print job is selected by the user, wherein the type of print job correlates with a suitable surface onto which the printed material is to be applied. The type of print job may include wall decals, wraps, window covers, stair risers, textiles, stickers, signage, crafts, and/or any other suitable type of print job. According to another embodiment, a type of print job is not selected and various types of print jobs are recommended based on one or more surfaces identified in a captured real world image.

In order to identify the surface on which the print job content is to be applied, one or more real world images of one or more surfaces are captured, at 820, using a camera. The camera may be coupled to the electronic device, coupled to a portable memory device, and/or is itself a standalone device. If a type of print job has been selected, the electronic device may, at 825, instruct the user to aim the viewing angle of the camera towards a surface correlating with a selected type of print job. Once the surface is in the viewing angle of the camera, the electronic device, at 830, identifies, locates, and isolates the surface, overlaying a marker over the real world image at the location of the surface on a display in electronic communication with the electronic device, creating an AR environment view of the real world image for analyzation by a user, as shown in FIG. 6.

The electronic device, at 835, measures the dimensions of the surface in the real world image. According to various embodiments, the measurement is performed in conjunction with the detection of the object on which the surface is located. According to various embodiments, the measurement is performed subsequent to the detection of the object. Using the measurements, position, and shape of the isolated surface, the electronic device, at 840, creates a printing template on which the print job content is to be applied. At 845, the electronic device displays the printing template to the user on the display, with the measurements, using the display, in an AR view. According to various embodiments, the printing template includes the selected print job content, forming a digital proof of the finalized printed material, enabling the user to see the surface with the print job content overlaid.

If the user approves of the printing template, the user, at 850, submits the printing template with the selected print job content to be ordered. The user, at 855, is presented with one or more suppliers to choose from to complete the order. The user then, at 860, selects a provider and submits the order to the provider. The provider then, at 865, produces the printed material and ships the printed material to the user.

According to an alternative embodiment, the print order creates a print file, which is sent to a print device, by the user, to print the print file. According to various embodiments, the print device is in electronic communication with the electronic device. According to various embodiments, the print file is stored on a portable memory device which is read by the print device.

In this document, "electronic communication" refers to the transmission of data via one or more signals between two or more electronic devices, whether through a wired or wireless network, and whether directly or indirectly via one or more intermediary devices. Devices are "communicatively connected" if the devices are able to send and/or receive data via electronic communication.

The term "portable memory device" refers to a portable device that has a non-transitory storage medium capable of storing data, such as a universal serial bus (USB) flash drive, a secure digital (SD) card or microSD card, a portable hard disk, a portable media player or any other portable memory device that has such storing capability. In various embodiments, the portable memory device does not need to include a processor. The portable memory device will typically have a file system. The portable memory device will include a data transfer device, such as a USB connector for a USB drive, input/output ports of an SD card or a radio unit (transceiver) of a near-field communication device such as a Bluetooth device.

A "computer," "computing device," or "electronic device" refers to a device that includes a processor and non-transitory, computer-readable memory. The memory may contain program instructions that, when executed by the processor, cause the computing device to perform one or more operations according to the program instructions. Examples of computing devices include personal computers, servers, mainframes, gaming systems, televisions, and portable electronic devices such as smartphones, smart watches, wearable electronic devices, digital cameras, fitness tracking devices, tablet computers, laptop computers, media players and the like.

The term "print device" refers to a machine having hardware capable of receiving a digital document file and use the information from the file and associated print instructions to print a document represented in the file on a substrate and produce a physical document. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. A print device may have additional capabilities such as scanning or faxing and thus may be a multifunction device.

A "print job" refers to a set of instructions that causes a print device to print one or more document files. In this document, the set of instructions may be from a user to a print device, or it may be generated by a system or the print device after detecting a trigger event.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method for using augmented reality to create a printing template, the method comprising:
   capturing, using a camera of a mobile electronic device, a real world image of a surface; and
   by a processor:
      receiving the real world image;
      processing the real world image to isolate and measure a portion of the surface on which print job content is to be applied;
      creating a printing template conforming to a shape and area of the isolated and measured portion of the surface,
         wherein the printing template includes a plurality of separate template portions, wherein each of the separate template portions is configured to be applied to a unique portion of the print job content;
      causing the real world image to be output on a display; and
      causing the display to output the printing template over the real world image, overlaid over the isolated and measured portion of the surface.

2. The method of claim 1, wherein the mobile electronic device is communicatively coupled to the display.

3. The method of claim 1, wherein each of the plurality of separate template portions has an area and measured dimensions.

4. The method of claim 1, further comprising receiving a selection of a type of print job.

5. The method of claim 4, wherein the type of print job comprises one or more of the following:
   wall decals; wraps; window covers; stair risers; textiles; stickers; signage; and crafts.

6. The method of claim 5, wherein processing the real world image further comprises automatically identifying and isolating the portion of the surface correlating with the type of print job selected.

7. The method as recited in claim 1, further comprising, by the processor, applying the print job content to the printing template, causing the print job content to be displayed over the real world image, overlaid over the isolated and measured portion of the surface.

8. The method as recited in claim 1, further comprising, by a graphical user interface, selecting the print job content.

9. The method of claim 8, wherein selecting the print job content includes uploading an image.

10. The method of claim 8, wherein selecting the print job content includes selecting content from a list of available content.

11. The method of claim 1, further comprising, by a graphical user interface, ordering a finalized print of the print job content conforming to the printing template.

12. A system for using augmented reality to create complex printing templates, the system comprising:
   a mobile electronic device including:
      a memory;
      a processor;
      a graphical user interface; and
      a camera,
         wherein the camera is configured to capture a real world image of a surface,
         wherein the graphical user interface is configured to enable a user to select print job content, and
         wherein the memory is configured to store software that, when run by the processor, causes the processor to:
            receive the real world image;
            process the real world image to isolate and measure a portion of the surface on which the print job content is to be applied;
            create a printing template conforming to a shape and area of the isolated and measured portion of the surface,
               wherein the printing template includes a plurality of separate template portions, wherein each of the separate template portions is configured to be applied to a unique portion of the print job content;
            cause the real world image to be output on a display; and
            cause the display to output the printing template over the real world image, overlaid over the isolated and measured portion of the surface.

13. The system of claim 12, further comprising the display, and
   wherein the mobile electronic device is communicatively coupled to the display.

14. The system of claim 13, wherein the software, when run by the processor, further causes the processor to apply the print job content to the printing template, causing the print job content to be displayed over the real world image, overlaid over the isolated and measured portion of the surface.

15. The system of claim 12, wherein the software, when run by the processor, further causes the processor, when applying the print job content to the printing template, to:
   determine a change in depth between each of the separate template portions; and
   resize each of the unique portions of the print job content according to the change in depth.

16. The system of claim 12, wherein the graphical user interface is further configured to enable the user to select a type of print job.

17. The system of claim 16, wherein the type of print job comprises one or more of the following:
   wall decals; wraps; window covers; stair risers; textiles; stickers; signage; and crafts.

18. The system of claim 16, wherein selecting the print job content includes uploading an image.

19. A method for using augmented reality to create a printing template, the method comprising:
   capturing, using a camera of a mobile electronic device, a real world image of a surface;
   receiving a selection of a type of print job including one or more of the following: wall decals; wraps; window covers; stair risers; textiles; stickers; signage; and crafts; and
   by a processor:
      receiving the real world image;
      processing the real world image to automatically identify, isolate, and measure a portion of the surface correlating with the type of print job selected and on which print job content is to be applied;
      creating a printing template conforming to a shape and area of the isolated and measured portion of the surface;
      causing the real world image to be output on a display; and causing the display to output the printing template over the real world image, overlaid over the isolated and measured portion of the surface.

20. The method of claim 19, wherein the mobile electronic device is communicatively coupled to the display.

21. The method of claim 19,
wherein the printing template includes a plurality of separate template portions, wherein each of the separate template portions is configured to be applied to a unique portion of the print job content, and
wherein each of the plurality of separate template portions has an area and measured dimensions.

22. The method as recited in claim 19, further comprising, by the processor, applying the print job content to the printing template, causing the print job content to be displayed over the real world image, overlaid over the isolated and measured portion of the surface.

23. The method as recited in claim 19, further comprising, by a graphical user interface, selecting the print job content.

24. The method of claim 23, wherein selecting the print job content includes uploading an image.

25. The method of claim 23, wherein selecting the print job content includes selecting content from a list of available content.

26. The method of claim 19, further comprising, by a graphical user interface, ordering a finalized print of the print job content conforming to the printing template.

* * * * *